United States Patent
Klumpp et al.

[11] Patent Number: 5,105,112
[45] Date of Patent: Apr. 14, 1992

[54] BLOWER FOR COOLING INTERNAL COMBUSTION ENGINE OF POWER VEHICLE

[75] Inventors: Daniel Klumpp, Baden-Baden; Ernst Muenster, Buehl-Vimbuch; Wolfgang Scheidel, Buehl; Ludger Adrian, Buehl; Hartmut Nitzsche, Buehl, all of Fed. Rep. of Germany

[73] Assignee: Robert Bosch GmbH, Stuttgart, Fed. Rep. of Germany

[21] Appl. No.: 550,132

[22] Filed: Jul. 6, 1990

[30] Foreign Application Priority Data

Sep. 15, 1989 [DE] Fed. Rep. of Germany ....... 3930892

[51] Int. Cl.⁵ .................. H02K 11/00; H02K 9/02
[52] U.S. Cl. ........................... 310/72; 310/52; 310/60 R
[58] Field of Search ............... 310/52, 58, 59, 60 R, 310/62, 65, 68 R, 72, 89

[56] References Cited

U.S. PATENT DOCUMENTS

| 1,551,752 | 9/1925 | Kriesel | 310/72 |
| 2,702,871 | 2/1955 | Sparklin | 310/72 |
| 3,659,188 | 4/1972 | Alexander et al. | 310/72 |
| 4,162,419 | 7/1979 | DeAngelis | 310/62 |
| 4,210,835 | 7/1980 | Neveux | 310/72 |
| 4,408,244 | 10/1983 | Weible | 310/68 C |

FOREIGN PATENT DOCUMENTS

| 0253397 | 5/1963 | Australia | 310/72 |
| 0742513 | 5/1943 | Fed. Rep. of Germany | 310/72 |
| 0676838 | 2/1930 | France | 310/72 |
| 0437112 | 10/1935 | United Kingdom | 310/72 |

Primary Examiner—Steven L. Stephan
Assistant Examiner—C. LaBalle
Attorney, Agent, or Firm—Michael J. Striker

[57] ABSTRACT

A blower for cooling an internal combustion engine of a power vehicle comprises an electric drive motor having a housing with slots for ventilation, and a series resistance provided on an outer side of the housing at a distance from the latter and covering the slots, the series resistance being connectable with and disconnectable from a working current circuit of the drive motor.

6 Claims, 1 Drawing Sheet

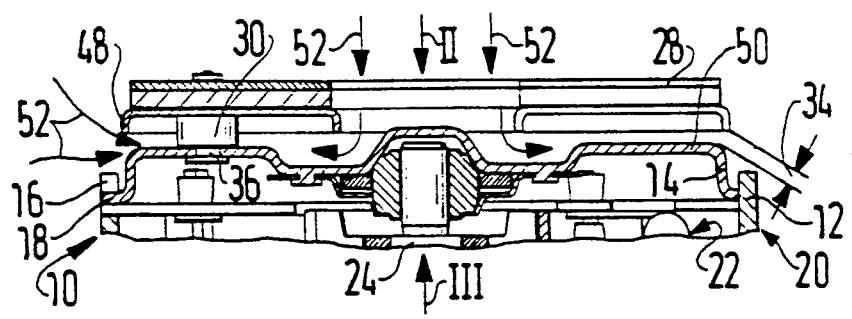
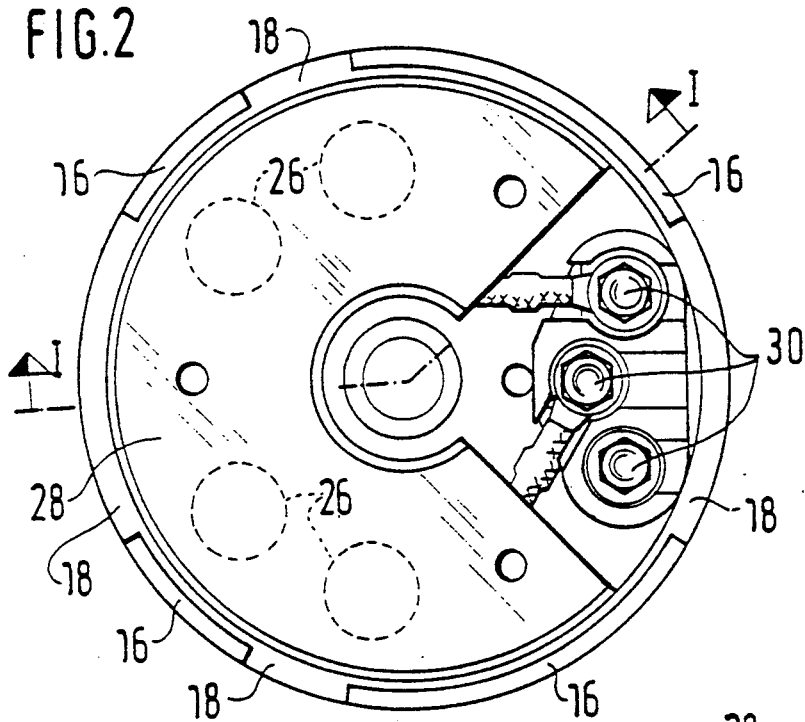
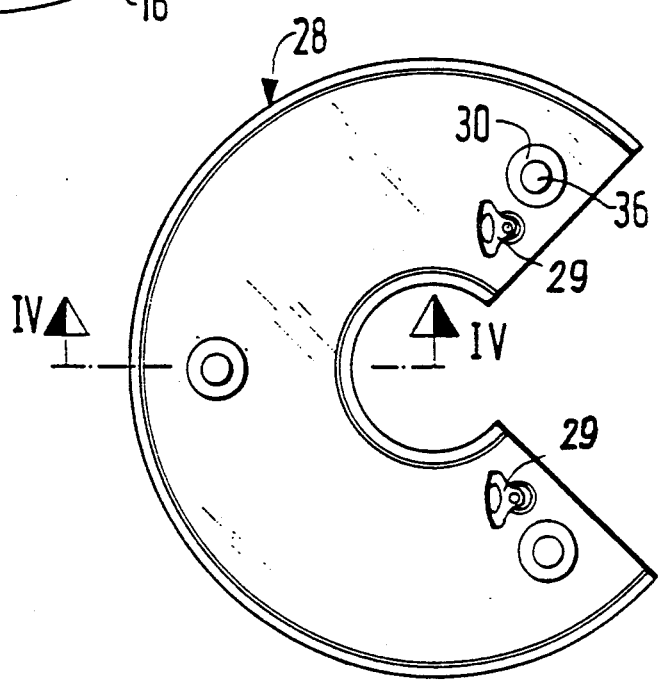
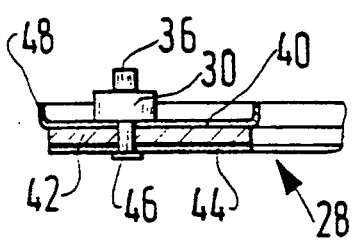

BLOWER FOR COOLING INTERNAL COMBUSTION ENGINE OF POWER VEHICLE

BACKGROUND OF THE INVENTION

The present invention relates to a blower for cooling an internal combustion engine of a power vehicle.

Cooling blowers of the above mentioned general type are known in the art. In a known cooling blower a drive motor is provided which has only one rotary speed stage. When the blower must operate after tuning of the internal combustion engine with reduced rotary speed for only predetermined time periods, the required electrical series resistance cannot be provided in the drive motor when it belongs to a structural rows which is optimized with respect to its space consumption. Such drive motors are provided with cooling slots in the motor housing due to high temperatures in the motor space of the power vehicles during their operation. These cooling slots must be however protected from penetration of foreign bodies and therefore respective measures must be taken.

SUMMARY OF THE INVENTION

Accordingly, it is an object of the present invention to provide a cooling blower of the above mentioned general type, which avoids the disadvantages of the prior art.

More particularly, it is an object of the present invention to provide a cooling blower of the above mentioned type which has the advantage that safety measures against penetration of foreign bodies in the drive motor are achieved in a simple manner.

In keeping with these objects and with others which will become apparent hereinafter, one feature of the present invention resides, briefly stated, in a blower for cooling an internal combustion engine of a power vehicle in which an electrical series resistance is arranged of the outer side of a housing of the electric drive motor at a distance from the housing so as to cover the slots, and the series resistance is connectable with a working current circuit of the drive motor and disconnectable from it. At the same time the electrical series resistance is located in a cooling air stream of the drive motor so that it is cooled by the cooling air stream of the drive motor.

When the blower is designed in accordance with the present invention, it avoids the disadvantages of the prior art and provides for the above mentioned advantageous results.

In accordance with another feature of the present invention, the motor housing cools a tubular closing body in at least one end plate which covers an opening of the tubular closing body. At least some of the ventilating slots of the housing are provided in the end plate, and the series resistance is mounted on the end plate.

The series resistance can be formed as a circular ring and arranged approximately concentrically to an extension of an axis of a shaft of the electric drive motor.

The series resistance can be provided with a base plate, a resistance coil arranged on the base plate at its side facing away of the housing of the motor, and a cover plate covering the resistance coil.

The base plate can have a substantially U-shaped cross-section, and the resistance coil can be arranged on the outer side of the U-shaped bottom of the base plate so that both legs of the U-shaped base plate extend toward the end plate.

A substantially annular gap can be formed between the free ends of the legs of the U-shaped base plate and the associated outer side of the end plate.

Finally, the end plate can have an annular outwardly extending region inserted between the legs of the U-shaped base plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a partial longitudinal cross-section of a drive motor of a blower for cooling an internal combustion engine of a vehicle in accordance with the present invention, the section taken along the line I—I in FIG. 2;

FIG. 2 is a plan view of the drive motor of the inventive blower of FIG. 1, as seen in direction of the arrow II in FIG. 1;

FIG. 3 is a plan view of an electrical series resistance removed from the drive motor, as seen in direction of the arrow III in FIG. 1; and FIG. 4 is a partial section of the electrical series resistance, taken along the line IV—IV in FIG. 3.

DESCRIPTION OF A PREFERRED EMBODIMENT

A blower for cooling an internal combustion engine of a not shown power vehicle in accordance with the present invention has an electric drive motor identified with reference numeral 10. The drive motor 10 has a housing provided with a tubular pole ring 12. The pole ring 12 operates as a closing body for a not shown permanent magnet arranged on an inner wall of the pole ring 12.

As can be seen from FIG. 1, a tubular opening of the closing body 12 is covered by at least one bearing plate 14. For this purpose the pole ring 12 has axial projections 16 formed on its end side and arranged at a distance from one another. The end plate 14 in turn has radial, tongue-shaped projections 18 engaging in the spaces between the projections 16. By caulking of the projections 16 the end plate 14 is fixedly connected with the closing body 12. Both the pole ring 12 and the end plate 14 are parts of a housing 20 which surrounds structural elements 22 of the drive motor 10.

The electric drive motor 10 has an armature shaft 24 with an end shown in FIG. 1. The other not shown end of the armature shaft carries an impeller for cooling the internal combustion engine of the power vehicle. As can be seen from FIG. 2, the end plate 14 has several slots 26 for ventilating the electric motor 10. In the shown embodiment the slots 26 lie on a partial circle, on which mounting openings for an electrical series resistance 28 are arranged. The electrical series resistance 28 is substantially circular. In the shown embodiment a section of approximately 90° is removed from the full circular shape, so that connecting elements 29 are accessible. The connecting elements connect the series resistance 28 with the working current circuit of the electric drive motor 10.

As can be further seen from FIGS. 1 and 2, the electrical series resistance 28 is arranged on the outer side of the housing 12, 14 of the motor. The series resistance 28 is seated on three so-called spacer rivets 30 which are dimensioned so that a distance or gap 34 is formed between the end plate 14 and the series resistance 28. The arrangement of the series resistance 28 relative to the end plate 14 is selected so that the series resistance 28 covers the slots 26 and the end plate 14. The spacer rivets 26 are on the one hand fixedly connected with the series resistance 28 and on the other hand anchored in open of the end plate 14. The substantially circular series resistance 28 is oriented concentrically to an extension of the axis of the motor shaft 24.

The series resistance 28 is sandwich-shaped. It has a base plate 40 shown in FIG. 4 and having a U-shaped cross-section. A resistance coil 42 is arranged on the outer side of the U-shaped base plate 40 and cover by a cover plate 48 at its side facing away from the base plate 40. The individual structural elements 40, 42, 44 of the series resistance 28 are substantially circular. They are assembled with one another by projections 46 of the spacer rivets 30. The series resistance 28 assembled from the individual elements 40, 42, and 44 is mounted on the end plate 14 so that the free ends of U-shaped legs 48 face toward the end plate.

The annular gap 34 is limited on the one hand by the end plate 14 and on the other hand by the outer U-shaped legs 48 of the base plate 40. By respective selection of the spacer rivets 30 the size of the annular gap 34 can be correspondingly adjusted. The size of the annular gap 34 is selected so that penetration of a foreign body in the motor is prevented but at the same time a sufficient aeration of the motor is insured. In some cases it can be of advantage when the end plate 14 has an annular outwardly extending region 50 inserted between the U-shaped legs 48 of the base plate 40.

For protecting against moisture it is recommended to cast the resistance coil 42 in a housing surrounding the resistance.

During the operation of the blower the drive motor 10 aspirates the cooling air through a the slots 26 in direction of the arrow 52 into the housing 20. The cooling air flows past the series resistance 28 so that it is sufficiently cooled.

It will be understood that each of the elements described above, or two or more together, may also find a useful application in other types of constructions differing from the types described above.

While the invention has been illustrated and described as embodied in a blower for cooling an internal combustion engine of a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A blower for cooling an internal combustion engine of a power vehicle, comprising an electric drive motor having a housing with slots for ventilation; and a series resistance provided on an outer side of said housing at a distance from the latter and covering said slots, said series resistance being connectable with and disconnectable from a working current circuit of said drive motor, said series resistance having a base plate, a resistance coil arranged on said base plate on its side facing away of said housing, and a cover plate covering said resistance coil, said base plate having a substantially U-shaped cross-section with a U-shaped bottom, said resistance coil being arranged on an outer side of said U-shaped bottom.

2. A blower as defined in claim 1 wherein said housing has a tubular closing body having an opening and at least one end plate covering said opening, at least some of said slots being provided in said end plate, said series resistance being mounted on said end plate.

3. A blower as defined in claim 1 wherein said electric drive motor has a motor shaft having an axis, said series resistance being formed substantially as a circular ring arranged approximately concentrically to an extension of said axis of said motor shaft of said electric drive motor.

4. A blower as defined in claim 1, wherein said housing has a tubular closing body having an opening and an end plate covering said opening, said base plate having two legs extending toward said end plate.

5. A blower as defined in claim 4, wherein said legs have free ends and together with an associated outer side of said end plate form a substantially ring-shaped gap.

6. A blower as defined in claim 4, wherein said end plate has a ring-shaped outwardly extending region which is located between said legs of said base plate.

* * * * *